US009454805B2

(12) United States Patent
Choi et al.

(10) Patent No.: US 9,454,805 B2
(45) Date of Patent: Sep. 27, 2016

(54) METHOD AND APPARATUS FOR REDUCING NOISE OF IMAGE

(71) Applicant: HANWHA TECHWIN CO., LTD., Changwon-si (KR)

(72) Inventors: Eun Cheol Choi, Changwon-si (KR); Jae Cheol Lee, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 84 days.

(21) Appl. No.: 14/496,401

(22) Filed: Sep. 25, 2014

(65) Prior Publication Data

US 2015/0279006 A1 Oct. 1, 2015

(30) Foreign Application Priority Data

Apr. 1, 2014 (KR) .................. 10-2014-0038751

(51) Int. Cl.
*G06K 9/40* (2006.01)
*G06T 5/00* (2006.01)
*G06T 7/20* (2006.01)

(52) U.S. Cl.
CPC ............. *G06T 5/002* (2013.01); *G06T 7/20* (2013.01); *G06T 7/2013* (2013.01); *G06T 2207/20182* (2013.01); *G06T 2207/20201* (2013.01)

(58) Field of Classification Search
CPC ........... G06K 9/40; G06T 5/002; G06T 5/20; G06T 5/50; G06T 2207/10016; G06T 2207/20012; G06T 2207/20182; G06T 2207/20192; H04N 5/142; H04N 5/144; H04N 5/145; H04N 5/21; H04N 5/213; H04N 7/0137; H04N 19/107; H04N 19/114; H04N 19/117; H04N 19/13; H04N 19/14; H04N 19/146; H04N 19/147; H04N 19/172; H04N 19/176; H04N 19/177; H04N 19/182; H04N 19/186; H04N 19/53; H04N 19/61; H04N 19/80

See application file for complete search history.

(56) References Cited

U.S. PATENT DOCUMENTS

| 6,067,125 | A | * | 5/2000 | May | H04N 19/80 348/451 |
| 6,434,196 | B1 | * | 8/2002 | Sethuraman | H04N 19/176 348/415.1 |
| 6,512,792 | B1 | * | 1/2003 | Naito | H04N 19/126 375/240.05 |
| 7,375,760 | B2 | * | 5/2008 | Kempf | H04N 7/0115 348/441 |
| 7,724,307 | B2 | | 5/2010 | Wan et al. | |
| 7,792,381 | B2 | * | 9/2010 | Rhee | H04N 5/21 348/606 |
| 7,821,578 | B2 | * | 10/2010 | Pathak | H04N 5/21 348/607 |
| 8,175,414 | B2 | | 5/2012 | Hsu | |

(Continued)

FOREIGN PATENT DOCUMENTS

| CN | 103093441 A | 5/2013 |
| KR | 10-2004-0024888 A | 3/2004 |

*Primary Examiner* — Jose Couso
(74) *Attorney, Agent, or Firm* — Sughrue Mion, PLLC

(57) ABSTRACT

An apparatus and method for reducing noise of an image are provided. The apparatus includes: a temporal noise reduction unit configured to remove temporal noise from an input frame by adjusting a temporal noise reduction intensity of the input frame based on a pixel-based motion degree and a block-based motion degree that are detected from the input frame and a reference frame and generate a first output frame; and a spatial noise reduction unit configured to remove spatial noise from the first output frame by adjusting a spatial noise reduction intensity of the first output frame based on similarity between peripheral pixels of the first output frame and the pixel-based motion degree and the block-based motion degree, thereby to generate a final output frame.

18 Claims, 7 Drawing Sheets

(56) References Cited

U.S. PATENT DOCUMENTS

| | | | |
|---|---|---|---|
| 8,270,756 B2* | 9/2012 | Ou | G06K 9/40 |
| | | | 348/607 |
| 8,447,130 B2* | 5/2013 | Chiu | H04N 5/21 |
| | | | 348/607 |
| 2010/0045870 A1 | 2/2010 | Chao | |

* cited by examiner

METHOD AND APPARATUS FOR REDUCING NOISE OF IMAGE

CROSS-REFERENCE TO RELATED APPLICATIONS

This application claims priority from Korean Patent Application No. 10-2014-0038751, filed on Apr. 1, 2014, in the Korean Intellectual Property Office, the disclosure of which is incorporated herein in its entirety by reference.

BACKGROUND

1. Field

Methods and apparatuses consistent with exemplary embodiments relate to reducing noise of an image.

2. Description of the Related Art

A conventional temporal and spatial noise reduction technology uses a method of distinguishing temporal noise reduction and spatial noise reduction, increasing a weight of the temporal noise reduction in a non-motion region, and increasing a weight of the spatial noise reduction in a motion region. When the temporal noise reduction is performed, a previous frame is used as it is or a temporal noise reduction result calculated in the previous frame is stored and used.

SUMMARY

One or more exemplary embodiments include a method and apparatus for reducing noise of an image capable of increasing a noise reduction effect and reducing motion blur.

Additional aspects will be set forth in part in the description which follows and, in part, will be apparent from the description, or may be learned by practice of the exemplary embodiments.

According to an aspect of an exemplary embodiment, there is provided an apparatus for reducing noise of an image including: a temporal noise reduction unit configured to remove temporal noise from an input frame by adjusting a temporal noise reduction intensity of the input frame based on a pixel-based motion degree and a block-based motion degree that are detected from the input frame and a reference frame, thereby to generate a first output frame from which the temporal noise is removed; and a spatial noise reduction unit configured to remove spatial noise from the first output frame by adjusting a spatial noise reduction intensity of the first output frame based on similarity between peripheral pixels of the first output frame and the pixel-based motion degree and the block-based motion degree, thereby to generate a final output frame.

The temporal noise reduction unit may include a motion detection unit configured to detect the pixel-based motion degree and the block-based motion degree and determine a first motion weight according to the pixel-based motion degree and the block-based motion degree and a temporal noise filter configured to weight-sum the input frame and the reference frame by using the first motion weight, and to generate the first output frame.

The first motion weight may have a value between 0 and 1, and increases in proportion to the pixel-based motion degree and the block-based motion degree.

The motion detection unit may include a first motion detection unit configured to calculate a first detection value indicating the pixel-based motion degree based on a ratio of a first filtering value obtained by low pass filtering the input frame with respect to a maximum value between the first filtering value and a second filtering value obtained by low pass filtering the reference frame, a block splitting unit configured to split the input frame into a plurality of blocks, a second motion detection unit configured to calculate a second detection value that is an average of first detection values of pixels included in each of the plurality of blocks, interpolate second detection values of a block including a current pixel and peripheral blocks, and calculate a third detection value indicating a block-based motion degree of the current pixel, and a weight determining unit configured to calculate the first motion weight based on the first detection value of the input frame and a third detection value of a previous input frame.

The weight determining unit may include a first weight determining unit configured to determine a first weight corresponding to the first detection value and a second weight determining unit configured to determine a second weight corresponding to the third detection value, wherein the first motion weight is calculated by a multiplication of the first weight and the second weight.

The spatial noise reduction unit may include a pattern matching unit configured to measure similarity between a patch with respect to a current pixel and patches with respect to peripheral pixels within a predetermined window of the first output frame and a spatial noise filter configured to generate a second output frame by applying weights to the peripheral pixels according to the similarity between the patches and weighted-averaging, and generate the final output frame by weight-summing the first output frame and the second output frame by using a second motion weight according to the pixel-based motion degree and the block-based motion degree.

The apparatus may further include a reference frame generating unit configured to generate the reference frame by weight-summing the first output frame and the second output frame by using a third motion weight according to the pixel-based motion degree and the block-based motion degree.

The third motion weight may have a smaller value than that of the second motion weight.

The second motion weight and the third motion weight may have values between 0 and 1, and increase in proportion to the pixel-based motion degree and the block-based motion degree.

The reference frame may be a frame, previous to the input frame, from which temporal noise and spatial noise are removed.

According to an aspect of another exemplary embodiment, there is provided a method of reducing noise of an image including: removing temporal noise from an input frame by adjusting a temporal noise reduction intensity of the input frame based on a pixel-based motion degree and a block-based motion degree that are detected from the input frame and a reference frame, thereby generating a first output frame; and removing spatial noise from the first output frame by adjusting a spatial noise reduction intensity of the first output frame based on similarity between peripheral pixels of the first output frame and the pixel-based motion degree and the block-based motion degree, thereby generating a final output frame.

The generating of the first output frame may include detecting the pixel-based motion degree and the block-based motion degree, determining a first motion weight according to the pixel-based motion degree and the block-based motion degree, and generating the first output frame by weight-summing the input frame and the reference frame by using the first motion weight.

The first motion weight may have a value between 0 and 1, and increases in proportion to the pixel-based motion degree and the block-based motion degree.

The determining of the first motion weight may include calculating a first detection value indicating the pixel-based motion degree based on a ratio of a first filtering value obtained by low pass filtering the input frame with respect to a maximum value between the first filtering value and a second filtering value obtained by low pass filtering the reference frame, splitting the input frame into a plurality of blocks, calculating a second detection value that is an average of first detection values of pixels included in each of the plurality of blocks, interpolating second detection values of a block including a current pixel and peripheral blocks and calculating a third detection value indicating a block-based motion degree of the current pixel, and calculating the first motion weight based on the first detection value of the input frame and a third detection value of a previous input frame.

The calculating of the first motion weight may include determining a first weight corresponding to the first detection value, determining a second weight corresponding to the third detection value, and calculating the first motion weight by a multiplication of the first weight and the second weight.

The generating of the final output frame may include measuring similarity between a patch with respect to a current pixel and patches with respect to peripheral pixels within a predetermined window of the first output frame, generating a second output frame by applying weights to the peripheral pixels according to the similarity between the patches and weight-averaging, and generating the final output frame by weight-summing the first output frame and the second output frame by using a second motion weight according to the pixel-based motion degree and the block-based motion degree.

The method may further include generating the reference frame by weight-summing the first output frame and the second output frame by using a third motion weight according to the pixel-based motion degree and the block-based motion degree.

The third motion weight may have a smaller value than that of the second motion weight.

The second motion weight and the third motion weight may have values between 0 and 1, and increase in proportion to the pixel-based motion degree and the block-based motion degree.

The reference frame may be a frame, previous to the input frame, from which temporal noise and spatial noise are removed.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Figure 1:
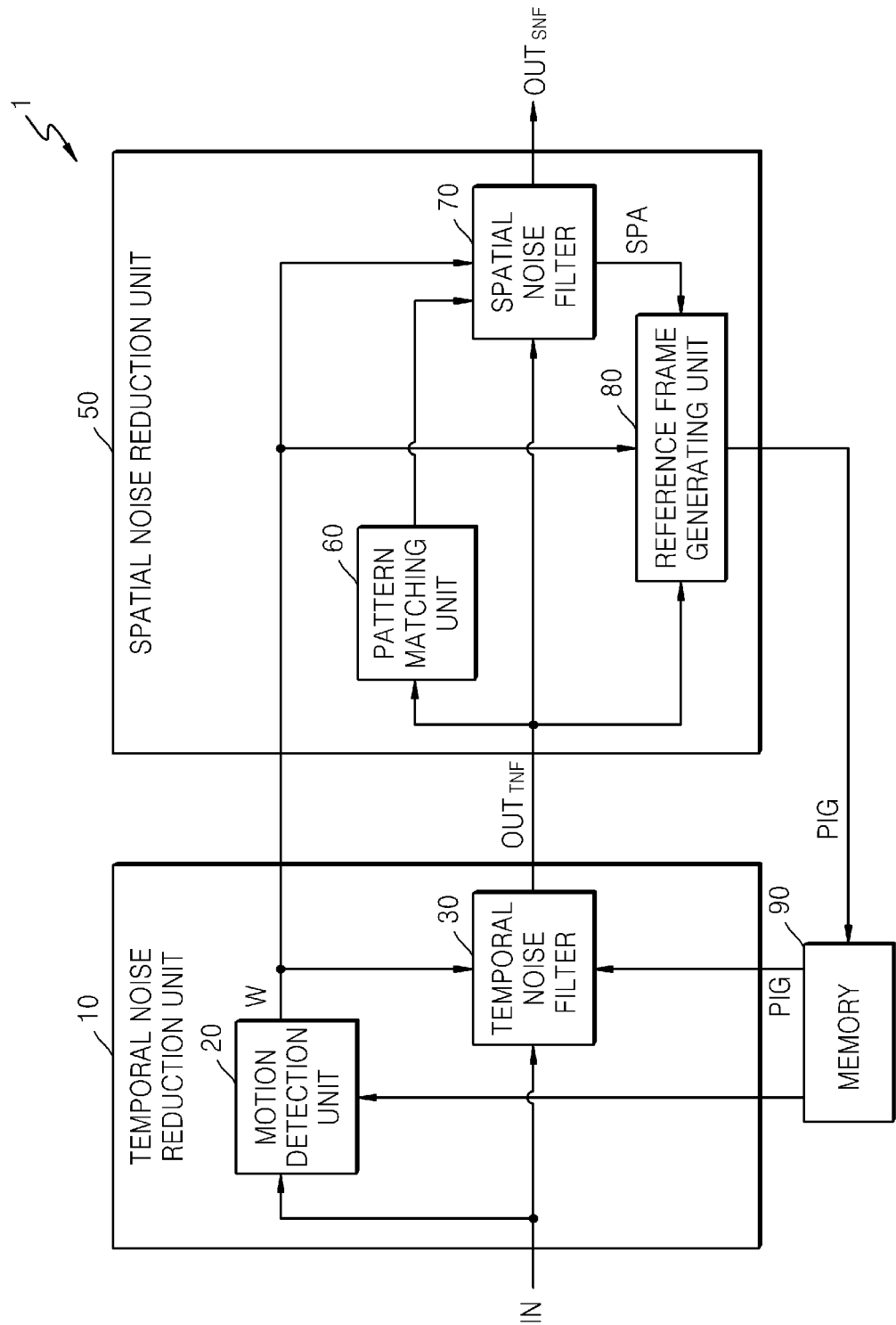
FIG. 1 is a block diagram schematically illustrating an apparatus for reducing noise of an image, according to an exemplary embodiment.

Reference will now be made in detail to exemplary embodiments which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the present description.

As the inventive concept allows for various changes and numerous embodiments, certain exemplary embodiments will be illustrated in the drawings and described in detail in the written description. However, this is not intended to limit the inventive concept to particular modes of practice, and it will to be appreciated that all changes, equivalents, and substitutes that do not depart from the spirit and technical scope of the inventive concept are encompassed in the inventive concept. In the description of the exemplary embodiments, certain detailed explanations of related art are omitted when it is deemed that they may unnecessarily obscure the essence of the inventive concept.

While such terms as "first", "second", etc., may be used to describe various components, such components must not be limited to the above terms. The above terms are used only to distinguish one component from another.

The terms used in the present specification are merely used to describe the exemplary embodiments, and are not intended to limit the inventive concept. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram schematically illustrating an apparatus 1 for reducing noise of an image, according to an exemplary embodiment.

Referring to FIG. 1, the apparatus 1 for reducing noise of the image includes a temporal noise reduction unit 10, a spatial noise reduction unit 50, and a memory 90.

An image (or a moving image) is input to the apparatus 1 in a frame unit.

The temporal noise reduction unit 10 adjusts a temporal noise reduction intensity (or degree) of an input frame IN based on a pixel-based motion degree and a block-based motion degree that are detected from the input frame IN and a reference frame PIG to generate and output a first output frame OUT_TNF. The first output frame OUT_TNF is a frame in which temporal noise is removed from the input frame IN. The reference frame PIG is a previous frame from which temporal noise and spatial noise are removed.

Weights of temporal noise reduction and spatial noise reduction vary in order to minimize a motion blur phenomenon caused by motion. To reduce the motion blur phenomenon during temporal and spatial noise reduction, a conventional method of increasing a weight of spatial noise reduction in a motion region is selected. Temporal noise reduction does not blur the image when there is no motion, and thus temporal noise reduction has an excellent noise reduction performance, compared to spatial noise reduction. In addition, although a noise reduction performance of spatial noise reduction is inferior to that of temporal noise reduction, since spatial noise reduction performs filtering by using a current pixel of a current frame and peripheral pixels thereof, no motion blue occurs. Thus, the method of merely increasing the weight of the spatial noise reduction can clearly remove noise in a non-motion region, whereas the method does not remove noise in a motion region as much as in the non-motion region.

If the motion is estimated by using a pixel level, since a simple noise is erroneously estimated as a motion, it is difficult to maximize the performance of temporal noise reduction.

Therefore, to enhance the noise reduction performance of the motion region in the exemplary embodiment, a temporally and spatially filtered previous frame is used as a reference frame for temporal noise reduction instead of a previous input frame or a previous frame from which temporal noise is removed.

To prevent a temporal noise reduction effect from being reduced due to a motion detection of the pixel level, the motion detection of the pixel level and a motion detection of a block level are simultaneously used to reduce an error motion detection rate. Accordingly, the noise reduction effect can be increased both in the motion region and the non-motion region in the exemplary embodiment. Furthermore, an occurrence of the motion blur can be reduced by increasing the noise reduction effect in the motion region. A motion detection error can be reduced by using a block-based motion detection result, and by using a new low pass filtered absolute ratio (LAR) instead of an existing low pass filtered absolute difference (LAD).

Generation of the reference frame PIG will be described in detail later.

The temporal noise reduction unit 10 may include a motion detection unit 20 and a temporal noise filter 30.

The motion detection unit 20 may detect a motion degree from the input frame IN and the reference frame PIG and determine a first motion weight W according to the motion degree.

Figure 2:
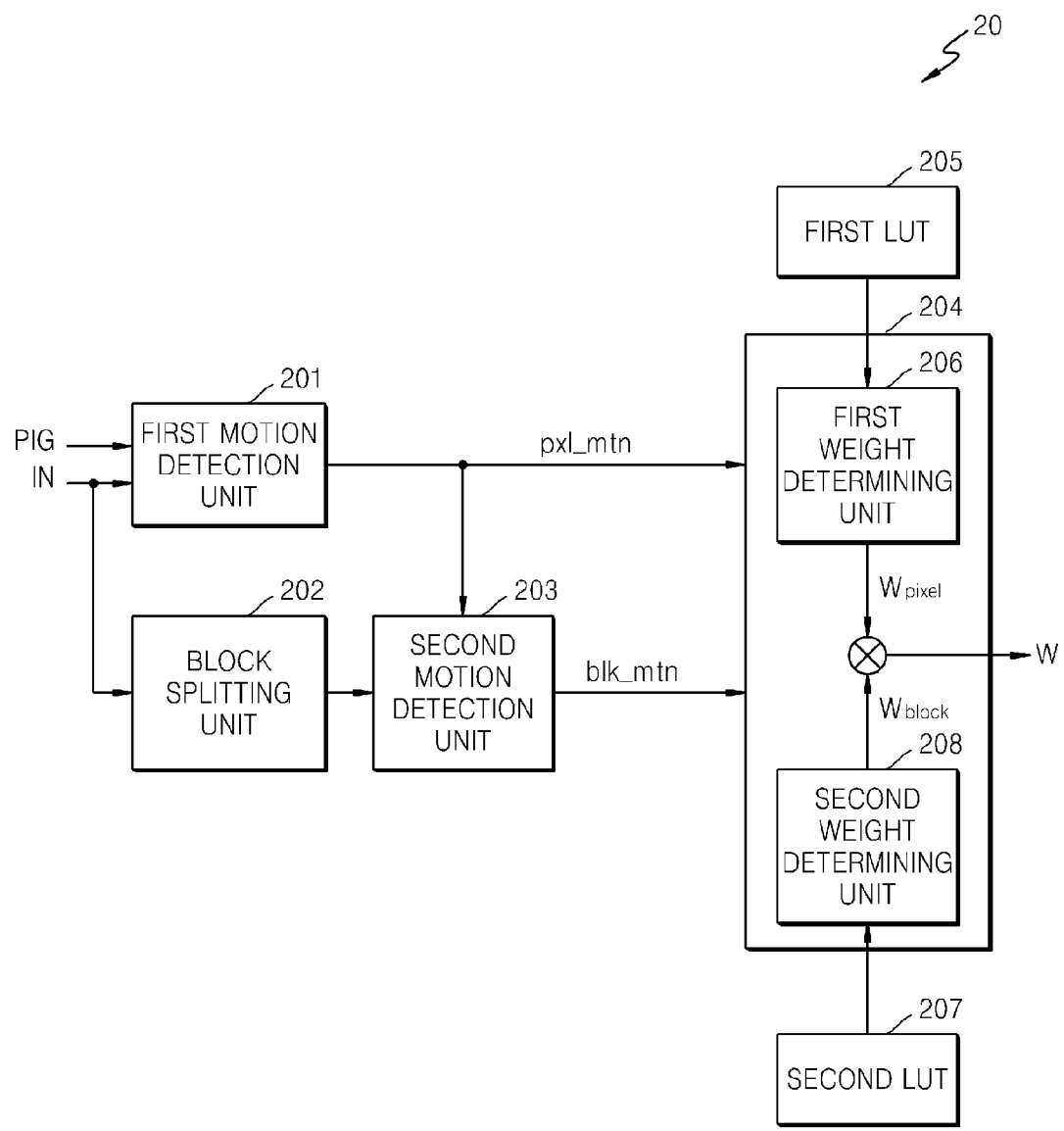
FIG. 2 is a block diagram schematically illustrating a motion detection unit according to an exemplary embodiment.

FIG. 2 is a block diagram schematically illustrating the motion detection unit 20 according to an exemplary embodiment.

Referring to FIG. 2, the motion detection unit 20 may include a first motion detection unit 201, a block splitting unit 202, a second motion detection unit 203, a weight determining unit 204, a first lookup table (LUT) 205, and a second lookup table (LUT) 207.

The first motion detection unit 201 may calculate a motion degree LAR in a pixel unit based on a ratio of a first filtering value LPF (IN) with respect to a maximum value Max (a, b) between the first filtering value LPF (IN) obtained by low pass filtering LPF the input frame IN and a second filtering value LPF (PIG) obtained by low pass filtering LPF the reference frame PIG, and calculate and output a first detection value pxl_mtn indicating the motion degree LAR.

The motion degree LAR is calculated by using a LAR as shown in Equation 1 below, wherein Offset denotes a parameter for adjusting a motion detection degree and may be optionally set by a user.

$$LAR(i, j) = \frac{LPF(IN(i, j))}{\text{Max}(LPF(IN(i, j)), LPF(PIG(i, j))) + \text{Offset}} \quad \text{[Equation 1]}$$

When a LAD that is a difference between an LPF value of a mask with respect to a current pixel of a current frame and an LPF value of a previous frame as a reference frame at a same location is used, a substantial motion detection degree varies according to a brightness value, which deteriorates an accuracy of the motion detection degree. For example, an LAD value of 10 is regarded as motion in a low illumination environment, whereas the LAD value of 10 is not the motion but is frequently noise in a bright region. However, when the LAD value is set in accordance with the bright region, motion cannot be detected in a dark region. In the exemplary embodiment, the motion detection degree is determined not according to a difference in the LPF value between a current frame and a reference frame but according to a ratio of the current frame and the reference frame, thereby achieving an accurate motion detection irrespective of the brightness of an image.

The block splitting unit 202 may split the input frame IN into a plurality of blocks.

The second motion detection unit 203 may calculate a second detection value blk_mtn' that is an average of first detection values pxl_mtn of pixels included in each block. The second motion detection unit 203 may perform a linear interpolation on second detection values blk_mtn' of a block including a current pixel and peripheral blocks and calculate and output a third detection value blk_mtn indicating a block-based motion degree of the current pixel.

Figure 5:
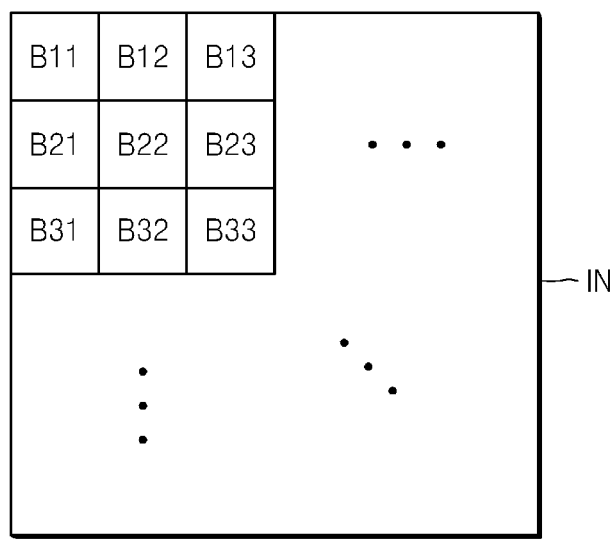
FIGS. 5 and 6 are diagrams for explaining a method of detecting a block-based motion degree, according to exemplary embodiments.
Figure 6:
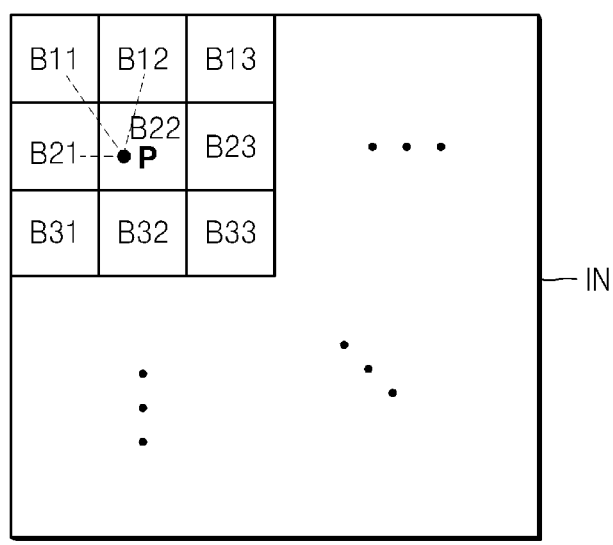

FIGS. 5 and 6 are diagrams for explaining a method of detecting a block-based motion degree, according to exemplary embodiments.

Referring to FIG. 5, the input frame IN is split into N×N blocks of a predetermined size. FIG. 5 illustrates the N×N blocks B11, B12, B13, . . . , B21, B22, B23, . . . , B31, B32, B33, . . . of the predetermined size. Each block comprises N×N pixels. A value obtained by averaging first detection value pxl_mtn of N×N pixels included in each block is calculated as a second detection value blk_mtn'.

Referring to FIG. 6, a distance between a center pixel in each of peripheral blocks, for example, B11, B12, and B21, of the block B22 including a current pixel P in the input frame IN and the current pixel P is used to perform a linear interpolation on the second detection values blk_mtn' of the peripheral blocks B11, B12, and B21 in the current pixel P. Thus, the third detection value blk_mtn indicating a block-based motion degree of the current pixel P may be calculated.

The peripheral blocks may be set as a predetermined number with respect to the block B22 including the current pixel P. For example, the peripheral blocks may be set as the blocks B11, B12, and B21 as shown in FIG. 6, or may be set as the blocks B12, B13, and B23, the blocks B12, B21, B23, and B32, or the blocks B11, B12, B13, B21, B23, B31, B32, and B33, but are not particularly limited thereto.

The weight determining unit 204 may calculate a first motion weight W based on the third detection value blk_mtn of a previous input frame and the first detection value pxl_mtn of a current input frame. For example, the first motion weight W may be calculated from the first detection value pxl_mtn detected from an nth input frame IN(n) and an nth reference frame PIG(n) and the third detection value blk_mtn detected from an n−1th input frame IN(n−1) and an n−1th reference frame PIG(n−1). That is, to calculate the first motion weight W, pixel-based motion is detected with respect to the current frame and block-based motion is detected with respect to the previous frame.

The weight determining unit 204 may include a first weight determining unit 206, and a second weight determining unit 208.

The first weight determining unit 206 may determine a first weight Wpixel corresponding to a first detection value pxl_mtn by using the first LUT 205. The first weight Wpixel has a value between 0 and 1. The greater the motion degree, the closer to 1 the value, and the smaller the motion degree, the closer to 0 the value.

Figure 3:
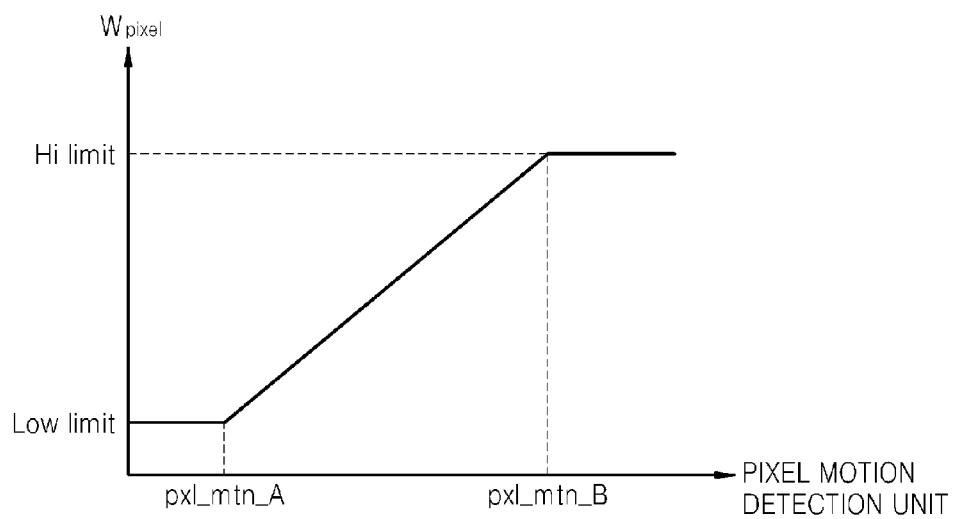
FIG. 3 is a graph as a first lookup table according to an exemplary embodiment.

The first LUT 205 is a table or a graph indicating a relationship between the first detection value pxl_mtn and the first weight Wpixel according to a pixel-based motion detection result. FIG. 3 is a graph as the first LUT 205 according to an exemplary embodiment. In the graph of FIG. 3, an x axis indicates the first detection value pxl_mtn according to the pixel-based motion detection result, and a y axis indicates the first weight Wpixel.

The first weight determining unit 206 may determine a first minimum weight Low limit if the first detection value pxl_mtn is smaller than a minimum threshold pxl_mtn_A, a first maximum weight Hi limit if the first detection value pxl_mtn is greater than a maximum threshold pxl_mtn_B, and a value between the first minimum weight Low limit and the first maximum weight Hi limit if the first detection value pxl_mtn is between the minimum threshold pxl_mtn_A and the maximum threshold pxl_mtn_B. In this regard, the first minimum weight Low limit may be 0, and the first maximum weight Hi limit may be 1.

The second weight determining unit 208 may determine a second weight Wblock corresponding to a third detection value blk_mtn by using the second LUT 207. The second weight Wblock has a value between 0 and 1. The greater the motion degree, the closer to 1 the value, and the smaller the motion degree, the closer to 0 the value.

Figure 4:
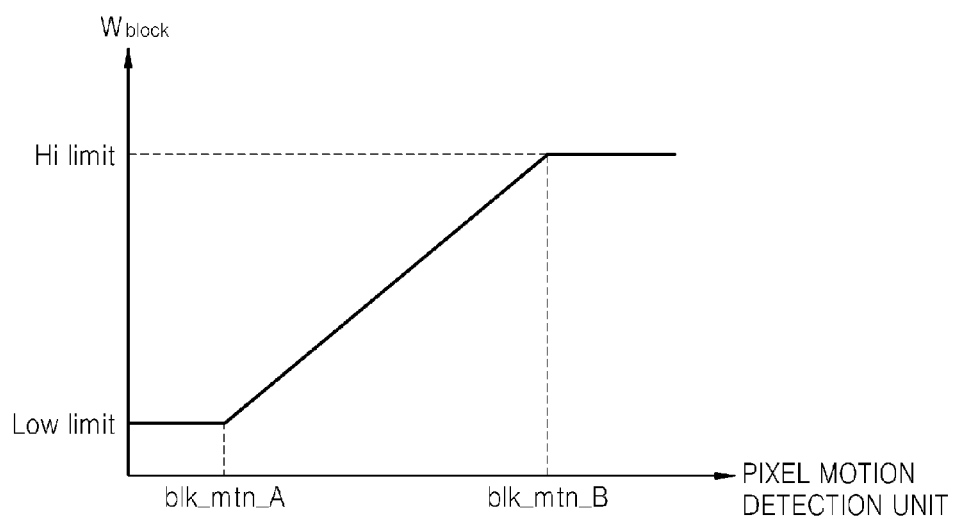
FIG. 4 is a graph as a second lookup table according to an exemplary embodiment.

The second LUT 207 is a table or a graph indicating a relationship between the third detection value blk_mtn and the second weight Wblock according to a block-based motion detection result. FIG. 4 is a graph as the second LUT 207 according to an exemplary embodiment. In the graph of FIG. 4, an x axis indicates the third detection value blk_mtn according to the block-based motion detection result, and a y axis indicates the second weight Wblock.

The second weight determining unit 208 may determine a second minimum weight Low limit if the third detection value blk_mtn is smaller than a minimum threshold blk_mtn_A, a second maximum weight Hi limit if the third detection value blk_mtn is greater than a maximum threshold blk_mtn_B, and a value between the second minimum weight Low limit and the second maximum weight Hi limit if the third detection value blk_mtn is between the minimum threshold blk_mtn_A and the maximum threshold blk_mtn_B. In this regard, the second minimum weight Low limit may be 0, and the second maximum weight Hi limit may be 1.

The weight determining unit 204 may calculate the first motion weight W by a multiplication of the first weight Wpixel and the second weight Wblock according to Equation 2 below.

$$W = W_{block} \times W_{pixel} \quad \text{[Equation 2]}$$

When the pixel-based motion is detected, noise may be detected as motion. In this case, a temporal noise reduction effect is reduced in a non-motion region, and an image blur effect occurs. In the exemplary embodiment, the block-based motion is detected in addition to the pixel-based motion detection, which supplements a pixel-based motion error detection by using the block-based motion, thereby reducing a final motion error detection rate. Thus, a temporal noise reduction effect may be improved.

Referring back to FIG. 1, the temporal noise filter 30 may generate a first output frame OUT_TNF by weight-summing the input frame IN and the reference frame PIG by using the first motion weight W as shown in Equation 3 below.

$$\text{Out}_{TNF}(i,j) = W(i,j) \times IN(i,j) + (1 - W(i,j)) \times PIG(i,j) \quad \text{[Equation 3]}$$

That is, the smaller the motion degree of the input frame IN, the closer to 0 the value of the first motion weight W, which increases a temporal noise reduction intensity of the temporal noise filter 30, thereby increasing a noise reduction effect.

The spatial noise reduction unit 50 adjusts a spatial noise reduction intensity of the first output frame OUT_TNF based on similarity of peripheral pixels of the first output frame OUT_TNF, in which the temporal noise is removed, and a motion degree thereof, and outputs a final output frame OUT_SNF in which spatial noise is removed.

The spatial noise reduction unit 50 may include a pattern matching unit 60, a spatial noise filter 70, and a reference frame generating unit 80.

The pattern matching unit 60 measures similarity between a patch with respect to a current pixel and patches with respect to peripheral pixels within a window of a predetermined size of the first output frame OUT_TNF.

Figure 7:
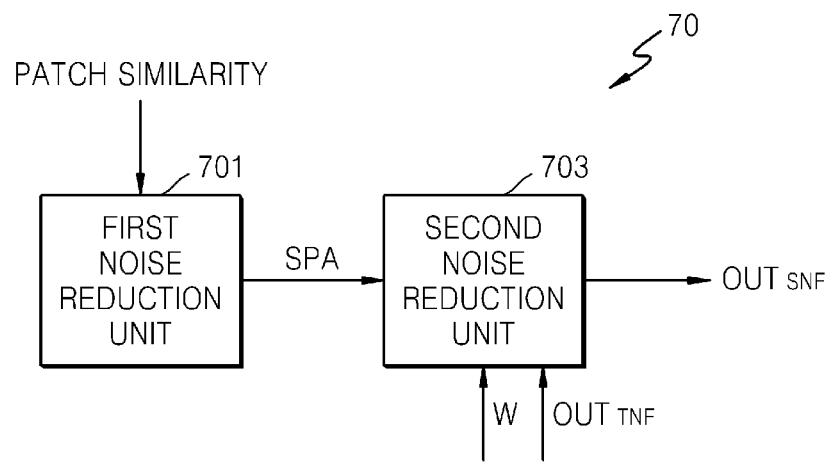
FIG. 7 is a block diagram schematically illustrating a spatial noise filter according to an exemplary embodiment.

FIG. 7 is a block diagram schematically illustrating the spatial noise filter 70 according to an exemplary embodiment.

Referring to FIG. 7, the spatial noise filter 70 may include a first noise reduction unit 701 and a second noise reduction unit 703.

The first noise reduction unit 701 applies and weighted-averages weights to peripheral pixels according to similarity between patches to generate a second output frame SPA. The first noise reduction unit 701 applies a non-local means (NLM)-based noise reduction technique to increase a weight of a center pixel of the patch having a higher similarity and reduce a weight of a center pixel of the patch having a lower similarity and weighted-average the weights, thereby removing noise. The NLM-based noise reduction technique is well known, and thus a detailed description thereof is omitted.

The second noise reduction unit 703 sets a second motion weight W_SNF according to a motion degree and weight-sums the first output frame OUT_TNF and the second output frame SPA by using the second motion weight W_SNF as shown in Equation 4 below, thereby generating the final output frame OUT_SNF. The second motion weight W_SNF is a value in proportional to the motion degree detected by the motion detection unit b 20 and has a characteristic similar to that of the first motion weight W. That is, the greater the motion degree of the input frame IN, the closer to 1 the value of the second motion weight W_SNF, and the smaller the motion degree thereof, the closer to 0 the value thereof.

$$OUT_{SNF}(i,j) = W_{SNF} \times SPA(i,j) + (1 - W_{SNF}) \times OUT_{TNF}(i,j) \quad \text{[Equation 4]}$$

That is, the greater the motion degree of the input frame IN, the closer to 1 the value of the second motion weight W_SNF, which increases the spatial noise reduction intensity of the second output frame SPA, and the smaller the motion degree thereof, the closer to 0 the value thereof, which increases a weight of the first output frame OUT_TNF.

Referring back to FIG. 1, the reference frame generation unit 80 may set a third motion weight W_PIG according to the motion degree and weighted-sum the first output frame OUT_TNF and the second output frame SPA by using the third motion weight W_PIG as shown in Equation 5 below, thereby generating the reference frame PIG.

$$PIG(i,j) = W_{PIG} \times SPA(i,j) + (1 - W_{PIG}) \times OUT_{TNF}(i,j) \quad \text{[Equation 5]}$$

The third motion weight W_PIG is a value in proportional to the motion degree detected by the motion detection unit 20 and has a characteristic similar to that of the first motion weight W. The reference frame PIG is used to remove temporal noise of a next frame, and thus the value of the third motion weight W_PIG is smaller than that of the second motion weight W_SNF. That is, a weight of the first output frame OUT_TNF for generating the reference frame PIG is greater than that of the first output frame OUT_TNF for generating the final output frame OUT_SNF. A weight of the second output frame SPA for generating the reference frame PIG is smaller than that of the second output frame SPA for generating the final output frame OUT_SNF. This is because temporal noise reduction has a characteristic of an infinite impulse response (IIR) structure, an influence of excessive spatial noise reduction of an original image to temporal noise reduction is minimized.

The memory 90 stores the reference frame PIG generated by removing temporal noise and spatial noise. The reference frame PIG is referred to as the reference frame PIG of a next frame that is input to the temporal noise reduction unit 10. The memory 90 may be included in the reference frame generating unit 80.

FIGS. 8 through 11 are flowcharts of a method of reducing noise of an image, according to exemplary embodiments. Redundant description between FIGS. 1 through 7 and FIGS. 8 through 11 is omitted.

Figure 8:
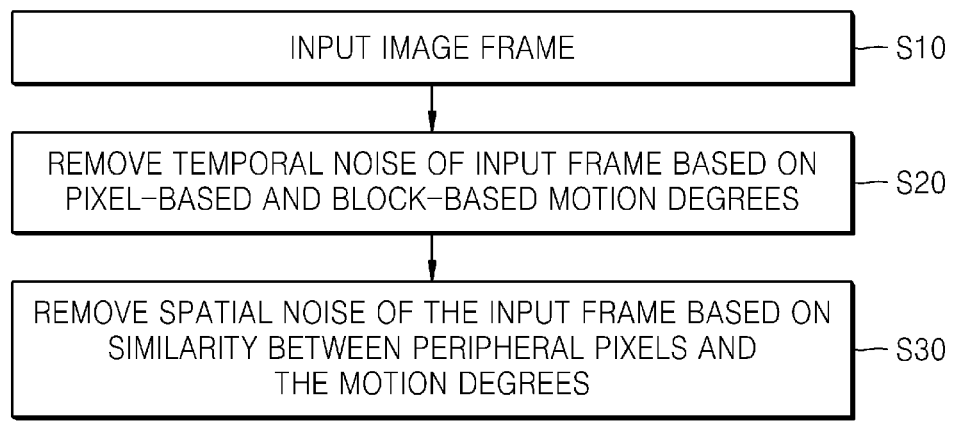
FIGS. 8 through 11 are flowcharts of a method of reducing noise of an image, according to exemplary embodiments.

Referring to FIG. 8, the apparatus for reducing noise of an image receives an image in a frame unit (operation S10).

The apparatus for reducing noise of an image may remove temporal noise of an input frame based on a pixel-based motion degree of the input frame and a block-based motion degree thereof (operation S20). In more detail, the apparatus for reducing noise of an image may detect the pixel-based motion degree and the block-based motion degree from the input frame and a reference frame, adjust the temporal noise reduction intensity of the input frame based on the pixel-based motion degree and the block-based motion degree, and generate a first output frame in which temporal noise is removed. The reference frame is a previous frame from which temporal noise and spatial noise are removed.

When a previous frame before noise is removed or a previous frame from which temporal noise is removed is used as the reference frame, since the noise reduction intensity of a motion region and the noise reduction intensity of a non-motion region differ, although spatial noise is removed later, a noise reduction result is not natural. Thus, a problem occurs that a first motion weight for temporal noise reduction that will be described later is not quite close to 0.

In the exemplary embodiment, a frame from which temporal noise and spatial noise are removed is used as the reference frame. In this case, since data from which spatial noise is removed is used in the motion region, a convergence speed of temporal and spatial noise reduction is accelerated, and thus a similar noise reduction effect is obtained in the motion region and the non-motion region. In this regard, a spatial noise reduction intensity of the reference frame is lower than that of the input frame, thereby minimizing deterioration (blurring) of the image caused by spatial noise reduction.

In the exemplary embodiment, since the frame from which temporal noise and spatial noise are removed is used as the reference frame, a convergence speed of temporal noise reduction is accelerated, and thus the first motion weight for temporal noise reduction may be set much closer to 1, and a noise reduction effect is excellent, thereby reducing motion blur.

In the exemplary embodiment, temporal noise reduction performance may be maximized by estimating motion of a pixel level and a block level.

Figure 9:
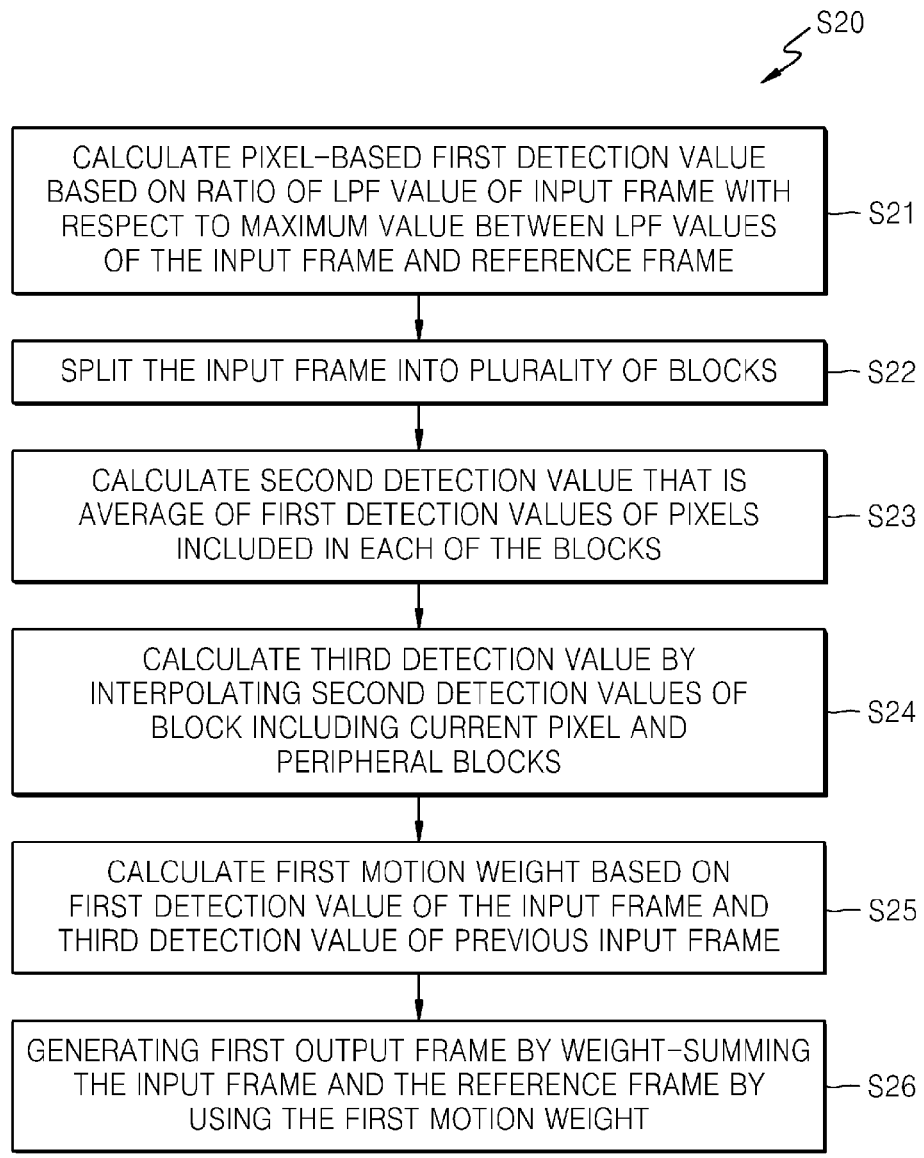

Referring to FIG. 9, the apparatus for reducing noise of an image may detect a motion degree of the input frame and determine the first motion weight according to the motion degree.

The apparatus for reducing noise of an image may calculate a first detection value indicating a pixel-based motion degree based on a ratio of a first filtering value obtained by low pass filtering the input frame with respect to a maximum value between the first filtering value and a second filtering value obtained by low pass filtering the reference frame (operation S21).

The apparatus for reducing noise of an image may split the input frame into a plurality of blocks (operation S22). The apparatus for reducing noise of an image may calculate a second detection value that is an average of first detection values of pixels included in each block (operation S23).

The apparatus for reducing noise of an image may interpolate second detection values of a block including a current pixel and peripheral blocks and calculate a third detection value indicating a block-based motion degree of the current pixel (operation S24). A range of the peripheral blocks may be modified.

Figure 10:
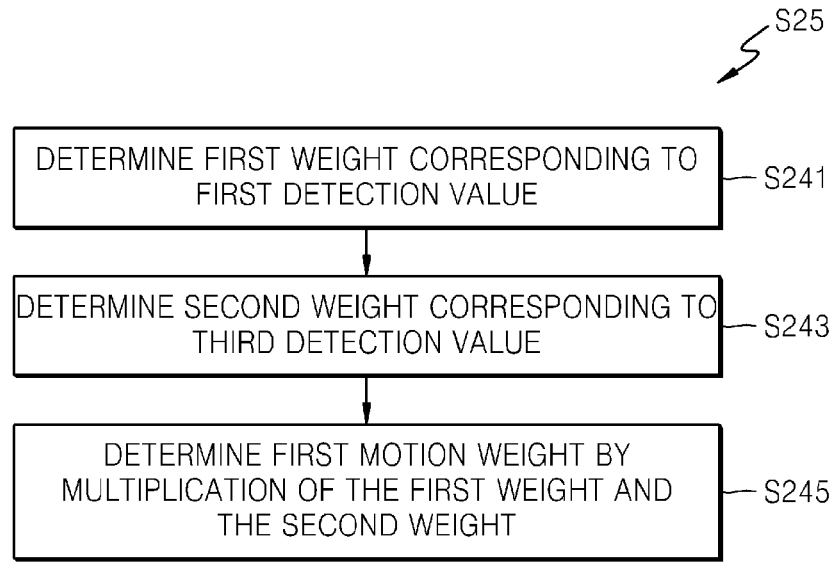

The apparatus for reducing noise of an image may calculate the first motion weight based on the first detection value of the input frame and the third detection value of a previous input frame (operation S25). Referring to FIG. 10, the apparatus for reducing noise of an image may determine a first weight corresponding to the first detection value by using a first LUT (operation S241), determine a second weight corresponding to the third detection value (operation S243), and calculate the first motion weight by a multiplication of the first weight and the second weight (operation S245).

The apparatus for reducing noise of an image may weighted-sum the input frame and the reference frame by using the first motion weight, thereby generating a first output frame (operation S26).

The apparatus for reducing noise of an image may remove spatial noise of the input frame based on similarity between peripheral pixels and the pixel-based motion degree and the block-based motion degree (operation S30). In more detail, the apparatus for reducing noise of an image may adjust the spatial noise reduction intensity of the first output frame based on similarity between peripheral pixels of the first output frame and a motion degree detected from the input frame and may generate a final output frame in which spatial noise is removed.

Figure 11:
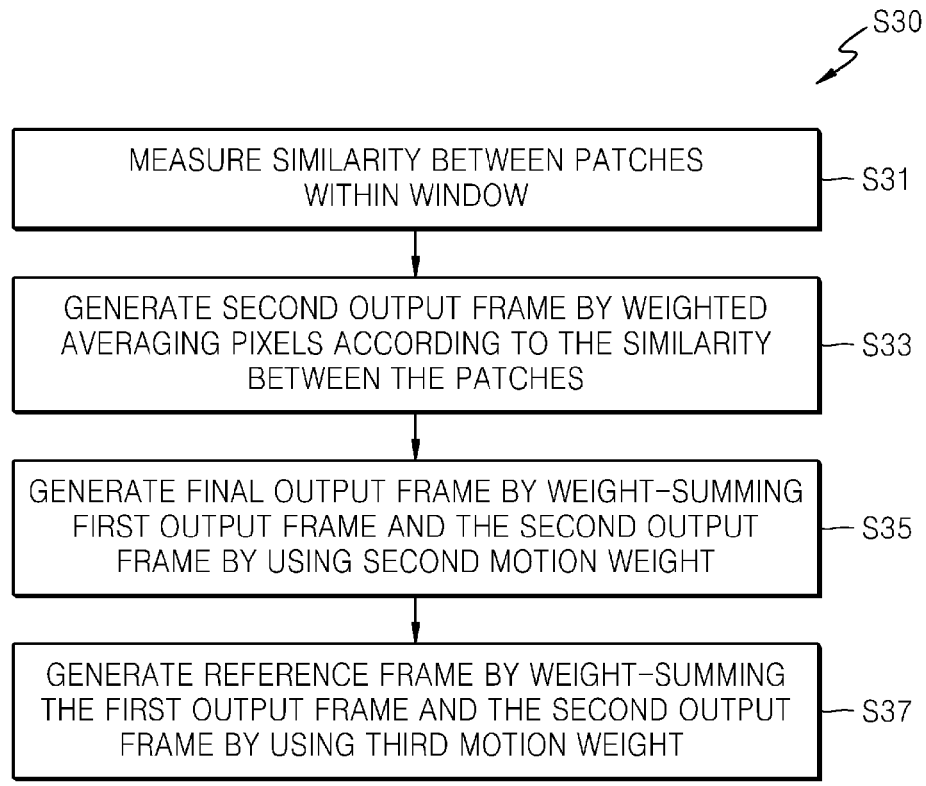

Referring to FIG. 11, the apparatus for reducing noise of an image may measure similarity between a patch with respect to the current pixel and patches with respect to the peripheral pixels within a window of a predetermined size of the first output frame (operation S31).

The apparatus for reducing noise of an image may apply and weighted-average weights to the peripheral pixels according to the similarity between patches and generate a second output frame (operation S33). The apparatus for reducing noise of an image may apply a NLM-based noise reduction technique to generate the second output frame.

The apparatus for reducing noise of an image may weighted-sum the first output frame and the second output frame by using a second motion weight according to the motion degree to generate the final output frame (operation S35). The second motion weight has a value between 0 and 1. The greater the motion degree, the closer to 1 the value, and the smaller the motion degree, the closer to 0 the value.

The apparatus for reducing noise of an image may weighted sum the first output frame and the second output frame by using a third motion weight according to the motion degree to generate the reference frame (operation S37). The third motion weight has a smaller value than that of the second motion weight. The third motion weight has a value between 0 and 1. The greater the motion degree, the closer to 1 the value, and the smaller the motion degree, the closer to 0 the value. The reference frame is used to remove temporal noise of a next input frame.

A moving image obtained by an image sensor has various types of noise caused by a sensor, a circuit, etc. The noise reduction method according to the exemplary embodiment removes noise by using correlations between continuous image frames. Thus, the exemplary embodiment may be applied to a camera system for obtaining a moving image, such as a video camera, a CCTV, etc.

As described above, according to the one or more of the above embodiments, a frame from which both temporal noise and spatial noise are removed is used as a reference frame, thereby increasing a noise reduction effect and reducing motion blur.

A motion of a pixel level and a block level is estimated, thereby maximizing temporal noise reduction performance.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments. For example, FIG. 1 illustrates that the spatial noise reduction unit 50 is disposed after the temporal noise reduction unit 10 to remove spatial noise from the first output frame OUT_TNF which is output from the temporal noise reduction unit 10 and in which temporal noise is removed. However, according to another exemplary embodiment, the spatial noise reduction unit 50 may be disposed before the temporal noise reduction unit 10 to remove spatial noise from an input frame IN, and the temporal noise reduction unit 10 receives an output frame of the spatial noise reduction unit 50 to remove temporal noise from this output frame in which spatial noise is removed.

At least one of the components, elements or units represented by a block as illustrated in FIGS. 1 and 2 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a central processing unit (CPU) that performs the respective functions, a microprocessor, or the like. Further, although a bus is not illustrated in the above block diagrams, communication between the components, elements or units may be performed through the bus.

While one or more exemplary embodiments have been described with reference to the figures, it will be understood by those of ordinary skill in the art that various changes in form and details may be made therein without departing from the spirit and scope of the inventive concept as defined by the appended claims.

What is claimed is:

1. An apparatus for reducing noise in an image, the apparatus comprising at least one processor to implement:
   a temporal noise reduction unit configured to remove temporal noise from an input frame by adjusting a temporal noise reduction intensity of the input frame based on a pixel-based motion degree and a block-based motion degree that are detected from the input frame and a reference frame, thereby to generate a first output frame; and
   a spatial noise reduction unit configured to remove spatial noise from the first output frame by adjusting a spatial noise reduction intensity of the first output frame based on similarity between peripheral pixels of the first output frame and the pixel-based motion degree and the block-based motion degree, thereby to generate a final output frame,
   wherein the spatial noise reduction unit comprises:
      a pattern matching unit configured to measure similarity between a patch with respect to a current pixel and patches with respect to peripheral pixels within a predetermined window of the first output frame; and
      a spatial noise filter configured to generate a second output frame by applying weights to the peripheral pixels according to the similarity between the patches and weighted-averaging, and generate the final output frame by weight-summing the first output frame and the second output frame by using a second motion weight according to the pixel-based motion degree and the block-based motion degree.

2. The apparatus of claim 1, wherein the temporal noise reduction unit comprises:
   a motion detection unit configured to detect the pixel-based motion degree and the block-based motion degree and determine a first motion weight according to the pixel-based motion degree and the block-based motion degree; and
   a temporal noise filter configured to weight-sum the input frame and the reference frame by using the first motion weight, to generate the first output frame.

3. The apparatus of claim 2, wherein the first motion weight has a value between 0 and 1, and increases in proportion to the pixel-based motion degree and the block-based motion degree.

4. The apparatus of claim 2, wherein the motion detection unit comprises:
a first motion detection unit configured to calculate a first detection value indicating the pixel-based motion degree based on a ratio of a first filtering value obtained by low pass filtering the input frame with respect to a maximum value between the first filtering value and a second filtering value obtained by low pass filtering the reference frame;
a block splitting unit configured to split the input frame into a plurality of blocks;
a second motion detection unit configured to calculate a second detection value that is an average of first detection values of pixels included in each of the plurality of blocks, interpolate second detection values of a block including a current pixel and peripheral blocks, and calculate a third detection value indicating a block-based motion degree of the current pixel; and
a weight determining unit configured to calculate the first motion weight based on the first detection value of the input frame and a third detection value of a previous input frame.

5. The apparatus of claim 4, wherein the weight determining unit comprises:
a first weight determining unit configured to determine a first weight corresponding to the first detection value; and
a second weight determining unit configured to determine a second weight corresponding to the third detection value,
wherein the first motion weight is calculated by a multiplication of the first weight and the second weight.

6. The apparatus of claim 1, further comprising a reference frame generating unit configured to generate the reference frame by weight-summing the first output frame and the second output frame by using a third motion weight according to the pixel-based motion degree and the block-based motion degree.

7. The apparatus of claim 6, wherein the third motion weight has a smaller value than that of the second motion weight.

8. The apparatus of claim 6, wherein the second motion weight and the third motion weight have values between 0 and 1, and increase in proportion to the pixel-based motion degree and the block-based motion degree.

9. The apparatus of claim 1, wherein the reference frame is a frame, previous to the input frame, from which temporal noise and spatial noise are removed.

10. An apparatus for reducing noise in an image, the apparatus comprising at least one processor to implement:
a spatial noise reduction unit configured to remove spatial noise from an input frame by adjusting a spatial noise reduction intensity of the input frame based on similarity between peripheral pixels of the input frame and a pixel-based motion degree and a block-based motion degree that are detected from the input frame, thereby to generate a first output frame, and
a temporal noise reduction unit configured to remove temporal noise from the first output frame by adjusting a temporal noise reduction intensity of the first output frame based on the pixel-based motion degree and the block-based motion degree that are detected from the input frame and a reference frame, and to generate a final output frame,
wherein the spatial noise reduction unit comprises:
a pattern matching unit configured to measure similarity between a patch with a current pixel and patches with respect to peripheral pixels within a predetermined window of the first output frame; and
a spatial noise filter configured to generate a second output frame by applying to the peripheral pixels according to the similarity between the patches and weighted-averaging, and generate the final output frame by weight-summing the first output frame and the second output frame by using a second motion weight according to the pixel-based motion degree and the block-based motion degree.

11. A method of reducing noise in an image, the method comprising:
removing temporal noise from an input frame by adjusting a temporal noise reduction intensity of the input frame based on a pixel-based motion degree and a block-based motion degree that are detected from the input frame and a reference frame, thereby generating a first output frame; and
removing spatial noise from the first output frame by adjusting a spatial noise reduction intensity of the first output frame based on similarity between peripheral pixels of the first output frame and the pixel-based motion degree and the block-based motion degree, thereby generating a final output frame,
wherein the generating of the final output frame comprises:
measuring similarity between a patch with respect to a current pixel and patches with respect to peripheral pixels within a predetermined window of the first output frame;
generating the final output frame by weight-summing the first output frame and to the similarity between the patches and weight-averaging; and
generating the final output frame by weight-summing the first output frame and the second output frame by using a second motion weight according to the pixel-based motion degree and the block-based motion degree.

12. The method of claim 11, wherein the generating of the first output frame comprises:
detecting the pixel-based motion degree and the block-based motion degree;
determining a first motion weight according to the pixel-based motion degree and the block-based motion degree; and
generating the first output frame by weight-summing the input frame and the reference frame by using the first motion weight.

13. The method of claim 12, wherein the first motion weight has a value between 0 and 1, and increases in proportion to the pixel-based motion degree and the block-based motion degree.

14. The method of claim 12, wherein the determining of the first motion weight comprises:
calculating a first detection value indicating the pixel-based motion degree based on a ratio of a first filtering value obtained by low pass filtering the input frame with respect to a maximum value between the first filtering value and a second filtering value obtained by low pass filtering the reference frame;
splitting the input frame into a plurality of blocks;
calculating a second detection value that is an average of first detection values of pixels included in each of the plurality of blocks;
interpolating second detection values of a block including a current pixel and peripheral blocks and calculating a third detection value indicating a block-based motion degree of the current pixel; and calculating the first motion weight based on the first detection value of the input frame and a third detection value of a previous input frame.

15. The method of claim 14, wherein the calculating of the first motion weight comprises:

determining a first weight corresponding to the first detection value;

determining a second weight corresponding to the third detection value; and calculating the first motion weight by a multiplication of the first weight and the second weight.

16. The method of claim 11, further comprising:

generating the reference frame by weight-summing the first output frame and the second frame by using a third motion weight according to the pixel-based motion degree and the block-based motion degree.

17. The method of claim 16, wherein the second motion weight and the third motion weight have values between 0 and 1, and increase in proportion to the pixel-based motion degree and the block-based motion degree.

18. The method of claim 11, wherein the reference frame is a frame, previous to the input frame, from which temporal noise and spatial noise are removed.

* * * * *